United States Patent
Takaira et al.

(10) Patent No.: US 6,750,982 B1
(45) Date of Patent: Jun. 15, 2004

(54) IMAGE FORMING APPARATUS

(75) Inventors: Masatoshi Takaira, Tokyo (JP); Katsuyuki Taima, Hiratsuka (JP)

(73) Assignee: Minolta Co., Ltd, Osaka (JP)

( * ) Notice: Subject to any disclaimer, the term of this patent is extended or adjusted under 35 U.S.C. 154(b) by 0 days.

(21) Appl. No.: 09/433,061

(22) Filed: Nov. 3, 1999

(30) Foreign Application Priority Data

Nov. 10, 1998 (JP) .......................................... 10-318497

(51) Int. Cl.[7] .............................................. G06K 15/00
(52) U.S. Cl. ...................... 358/1.9; 358/401; 358/1.15
(58) Field of Search ................................ 358/401, 501, 358/444, 404, 440, 435, 438, 1.9, 1.15, 1.16

(56) References Cited

U.S. PATENT DOCUMENTS

| | | | | |
|---|---|---|---|---|
| 5,014,300 A | * | 5/1991 | Harvath ........................ | 379/100 |
| 5,291,305 A | * | 3/1994 | Sakashita .................... | 358/444 |
| 5,625,407 A | * | 4/1997 | Biggs .......................... | 348/16 |
| 6,145,016 A | * | 11/2000 | Lai ................................ | 710/4 |
| 6,288,716 B1 | * | 9/2001 | Humpleman ................ | 345/329 |
| 6,424,424 B1 | * | 7/2002 | Lomas et al. ............... | 358/1.15 |
| 6,496,283 B1 | * | 12/2002 | Kabeya ....................... | 358/468 |
| 6,542,892 B1 | * | 4/2003 | Cantwell ..................... | 707/10 |

FOREIGN PATENT DOCUMENTS

| | | | | |
|---|---|---|---|---|
| JP | 08-161250 A | 6/1996 | .......... | G06F/13/10 |
| JP | 10-063451 A | 3/1998 | .......... | G06F/13/00 |

* cited by examiner

*Primary Examiner*—Jerome Grant, II
(74) *Attorney, Agent, or Firm*—Morrison & Foerster LLP

(57) ABSTRACT

An object of the present invention is to provide an image forming apparatus which can reduce the burdensome operation of installing a printer driver performed by a supervisor. To attain the object, a printer according to the present invention has the function of transmitting electronic mail to personal computers connected to a network. To the electronic mail, various data for using the printer with each of the personal computers 4A, 4B, and 4C and a printer driver for the printer are attached. Accordingly, the printer driver can be delivered without intervention of the supervisor.

8 Claims, 3 Drawing Sheets

US 6,750,982 B1

IMAGE FORMING APPARATUS

CROSS-REFERENCE TO RELATED APPLICATIONS

This application is based on Application No. HEI 10-318497 filed in Japan, the content of which is hereby incorporated by reference.

BACKGROUND OF THE INVENTION

1. Field of the Invention

The present invention relates to an image forming apparatus having the function of transmitting electronic mail.

2. Description of the Related Art

As a network environment has expanded in recent years, a plurality of printers have been connected to the network. As a result, a user is allowed to select a given one of the printers via a personal computer connected to the network and cause the selected printer to perform a printing operation.

To cause the selected printer to perform a proper printing operation, a printer driver for the printer should be installed on the personal computer. If the compatible printer driver has not been installed on the personal computer, an erroneous printing operation might be performed.

To prevent the erroneous printing operation, there has been proposed an exemplary technique which causes a personal computer to automatically identify the model of a printer newly connected to a network and display, on the screen, the massage that printing cannot be performed with the printer if the printer driver for the model has not been installed on the personal computer (see Japanese Unexamined Patent Publication No. HEI 10-63451).

Since the technique described in the publication allows a user to recognize whether or not printing can be performed on the screen, it prevents printing with an uninstalled printer driver, i.e., erroneous printing.

With the technique described in the publication, however, the compatible printer driver should eventually be set on the personal computer of each user. In other words, it is required to perform the operation of installing the printer driver for the printer on each personal computer.

Since only the supervisor of the printer normally possesses a software for the printer driver, the supervisor is requested to lend the software to the user or visit the user to install the software if necessary. Since the installing operation needs much labor if the follow-up to setting is included therein, a heavy burden is placed on the supervisor.

SUMMARY OF THE INVENTION

The present invention has been achieved in view of such a problem encountered by the prior art and it is therefore an object of the present invention to provide an image forming apparatus having the function of transmitting electronic mail which can reduce burdensome installing operation to be performed by the supervisor.

An image forming apparatus according to the present invention, which attains the foregoing object, comprises: a storing unit connected to other external devices via a network to store address data for the external devices; and a transmitting unit for transmitting, based on the address data stored in the storing unit, data for using the image forming apparatus to one of the external devices.

In the image forming apparatus according to the present invention which attains the foregoing object, the data for using the image forming apparatus is a printer driver.

In the image forming apparatus according to the present invention which attains the foregoing object, the address data is an electronic mail address.

In the image forming apparatus according to the present invention which attains the foregoing object, the transmitting unit attaches a printer driver to electronic mail and sends electronic mail with the printer driver to the electronic mail address of the image forming apparatus.

Another image forming apparatus according to the present invention, which attains the foregoing object, comprises: a storing unit connected to other external devices via a network to store address data for the external devices; a transmitting unit for transmitting, based on the address data stored in the storing unit, data for using the image forming apparatus to one of the external devices; and a receiving unit for receiving return data from that one of the external devices to which the data for using the image forming apparatus has been transmitted, the transmitting unit transmitting again the data for using the image forming apparatus to that one of the external devices which has not transmitted the return data.

BRIEF DESCRIPTION OF THE DRAWINGS

These and other objects and features of the present invention will become apparent from the following description of the preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

Figure 1:
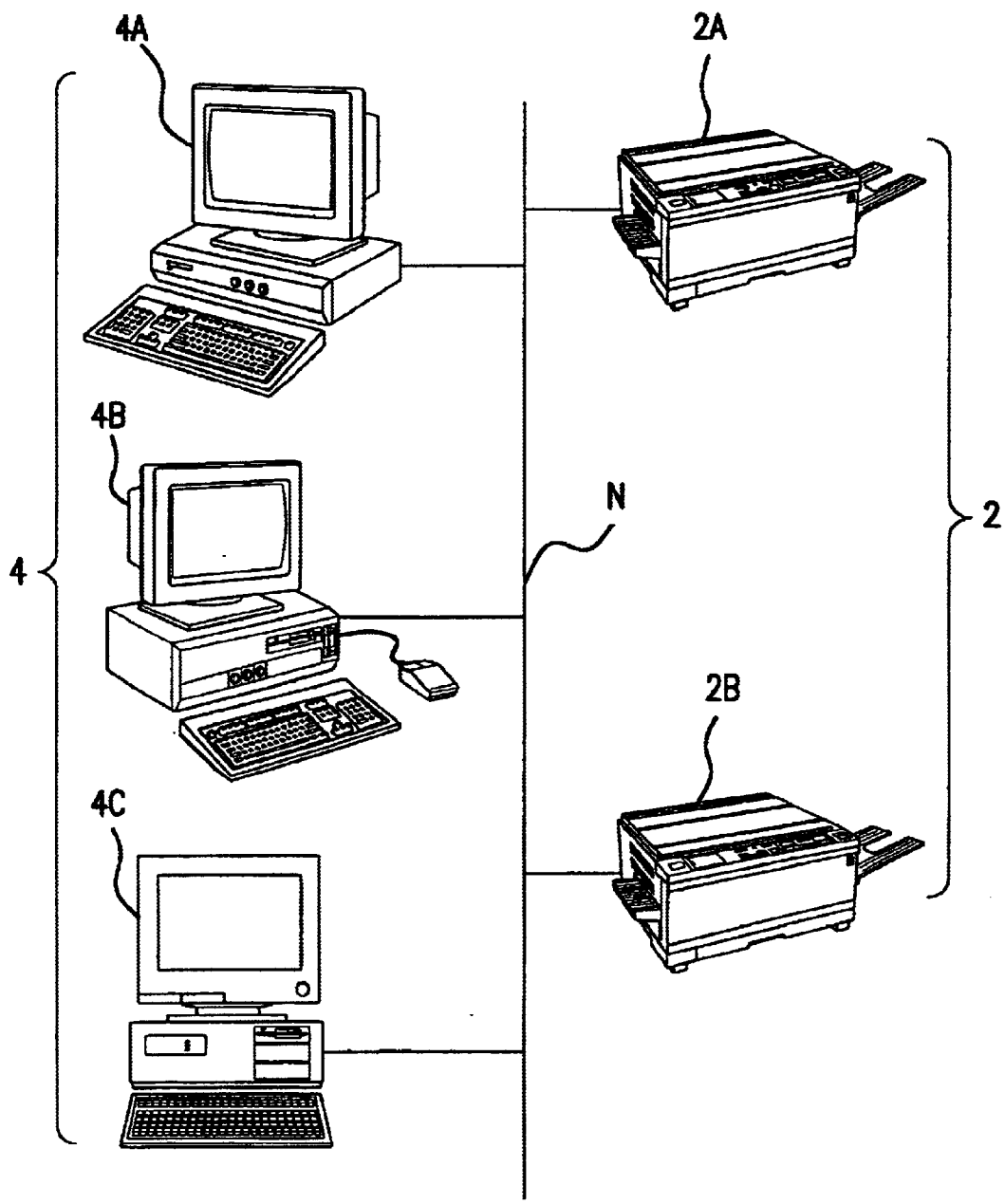
FIG. 1 is a view for illustrating the connection between printers and personal computers.

The preferred embodiments of the present invention are described hereinafter with reference to the accompanying drawings.

Referring to the drawings, an embodiment of the present invention will be described below in detail.

In the present embodiment, printers will be described as an example of the image forming apparatus and personal computers (hereinafter simply referred to as PCs) will be described as other external devices.

FIG. 1 is a view for illustrating the connection between the printers and PCs. The PCs 4A, 4B, and 4C (hereinafter collectively referred to as PCs 4) are connected to the printers 2A and 2B via a network N.

When printing is to be performed, either of the printers 2A and 2B is selected via the PCs 4. For this purpose, printer drivers compatible with the respective printers 2A and 2B (hereinafter also collectively referred to as printers 2) have been installed on the PCs 4.

In the case where a new printer is added to the network N or the printer 2B is changed to a different model, however, proper printing cannot be performed even when the printer is specified since the printer driver for the specified printer has not been installed on the PCs 4.

To prevent this, the present invention has imparted the function of transmitting electronic mail to the printer such that data for using the printer and the printer driver for the printer are distributed to each of the PCs 4A, 4B, and 4C through electronic mail. A description will be given below to a specific structure of the printer 2 having such a function.

Figure 2:
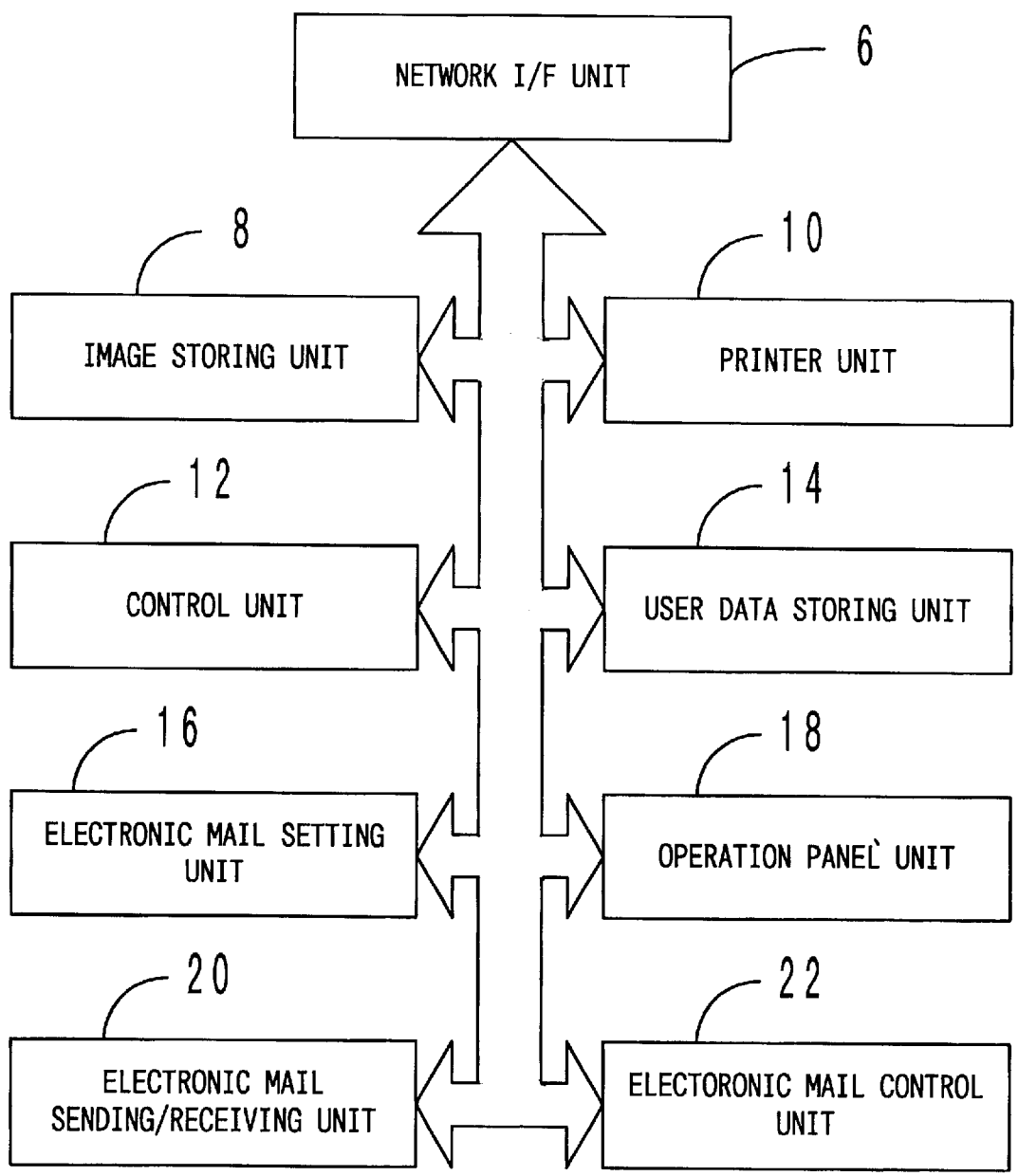
FIG. 2 is a block diagram showing a schematic structure of an image forming apparatus according to the present invention.

FIG. 2 is a block diagram showing the schematic structure of the printer according to the present invention.

A network I/F unit 6 is an interface for communication with the PCs 4 which is connected thereto via the network N. The network I/F unit 6 fetches image data outputted from the PCs 4 and delivers electronic mail to the PCs 4.

An image storing unit 8 stores the image data sent from the PCs 4 and a printer unit 10 prints the image data.

A control unit 12 collectively controls the operation of the printer 2. The control unit 12 receives the image data outputted from the PCs 4 to cause the printer unit 10 to print the received image data and delivers, to each of the PCs 4A, 4B, and 4C, an electronic mail message in which the printer driver is attached to the data for using the printer.

Since the printer 2 according to the present invention is adapted to not only perform a printing operation but also deliver electronic mail, it has the following structure which is unprovided in a normal printer.

In a user data storing unit 14, there are stored the electronic mail addresses of the individual users using the PCs 4 (i.e., the electronic mail addresses of the individual PCs) and setting complete flags indicative of whether or not the printer drivers for the printers 2A and 2B connected to the network N and the printer driver for the added printer have been installed on the PCs 4. There are also stored the data for using the printer such as "method of setting the printer" and "location at which the printer is placed" and a software for the printer driver attached to an electronic mail message.

In an electronic mail setting storing unit 16, there is stored various setting data required for sending and receiving electronic mail to and from the user in the environment in which the printers 2 are placed. The setting data includes, e.g., the IP address (destination data) of an electronic mail server (one of the PCs 4) connected to the network N, an electronic mail account number allotted to the corresponding one of the printers 2, and a password.

An operational panel unit 18 receives an operational instruction to the printer, while receiving the electronic mail address of each user and the various setting data required for sending and receiving electronic mail. The electronic mail address and the various setting data received by the operational panel unit 18 are stored in the user data storing unit 14 and in the electronic mail setting storing unit 16, respectively.

An electronic mail sending/receiving unit 20 is periodically connected to the electronic mail server by referring to the IP address stored in the electronic mail setting storing unit 16 so as to send and receive electronic mail.

An electronic mail control unit 22 controls the operational instruction outputted to the electronic mail sending/receiving unit 20 or the like based on the situation in which electronic mail is received by the electronic mail sending/receiving unit 20.

Figure 3:
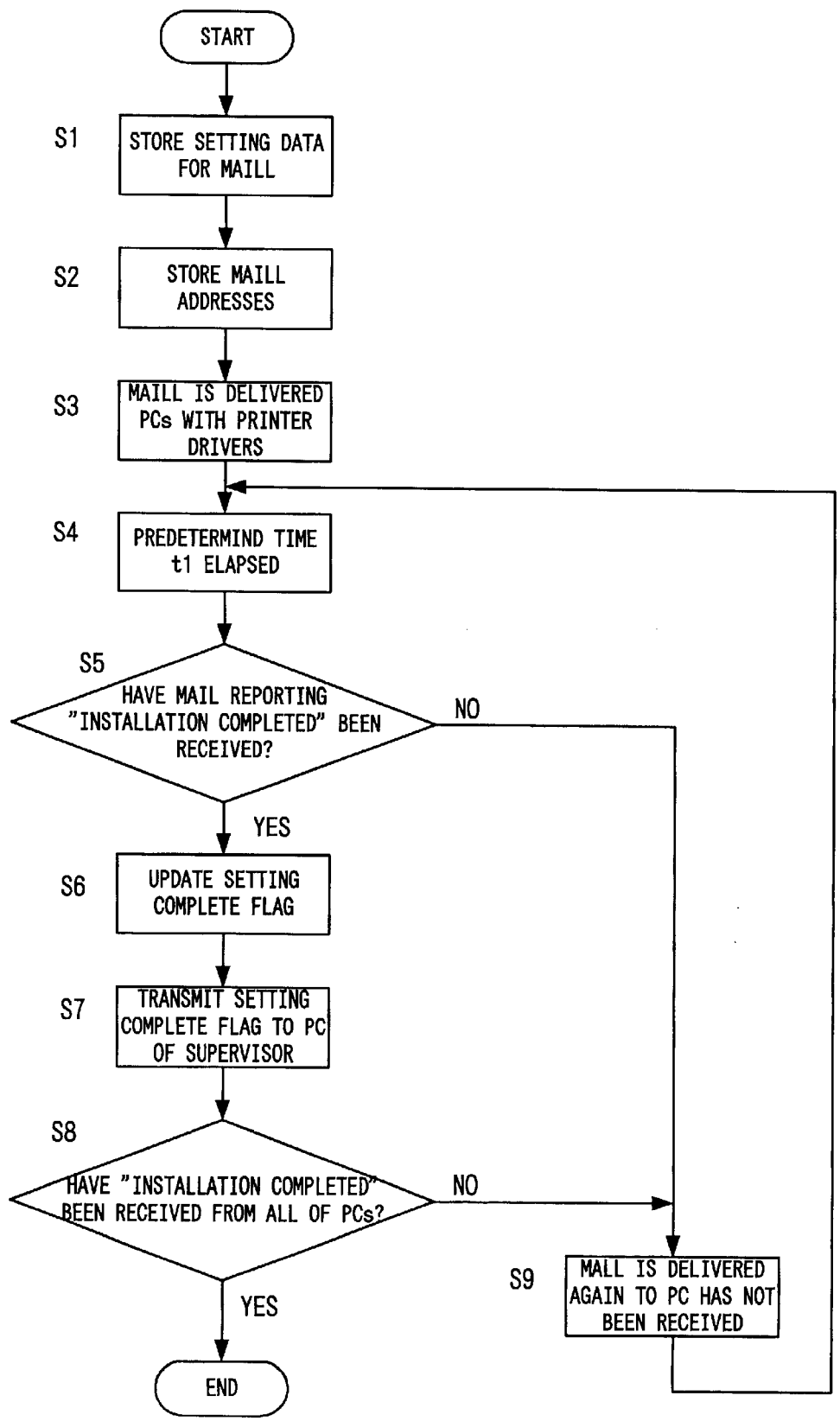
FIG. 3 is a flow chart showing an example of a specific procedure for handling electronic mail performed by the image forming apparatus according to the present invention.

In accordance with the flow chart of FIG. 3, an exemplary process of handling electronic mail by the printer according to the present invention will be described.

For the printer according to the present invention to handle electronic mail, it is necessary to preliminarily store the various setting data for sending and receiving electronic mail and the electronic mail addresses. Accordingly, the various setting data and the electronic mail addresses are inputted via the operational panel unit 18. Specifically, "IP address of the electronic mail server, an electronic mail account number allotted to the printer, password, and electronic mail address" are inputted through the keying operation of the operational panel unit 18. As a result of the inputting operation, the control unit 12 causes the user data storing unit 14 to store the electronic mail address and causes the electronic mail setting storing unit 16 to store the setting data including the IP address, the electronic mail account number, and the password (S1, S2).

The control unit 12 fetches the electronic mail addresses of the PCs 4 which are stored in the user data storing unit 14 and the IP address which is stored in the electronic mail setting storing unit 16 and sends electronic mail based on the addresses. Briefly, electronic mail is delivered to the electronic mail server connected to the network N.

In delivering electronic mail, the printer drivers are attached to the data for using the printer stored in the user data storing unit 14. Consequently, electronic mail in which the method of setting the printer and the location at which the printer is placed are described is delivered to the individual PCs 4A, 4B, and 4C with the software for the printer driver for the printer being attached thereto. The delivery of electronic mail is performed via the electronic mail receiving unit 20 and the network I/F unit 6 (S3).

The electronic mail control unit 22 controls the arrival of an electronic mail message reporting "installation completed" from the user via the electronic mail sending/receiving unit 20. Specifically, the electronic mail control unit 22 accesses the electronic mail server to monitor whether or not electronic mail reporting the completion of installation of the printer driver delivered was transmitted from any of the PCs 4A, 4B, and 4C after a predetermined time t1 elapsed (S4, S5).

After the predetermined time t1, if electronic mail reporting "installation completed" is received from any of the PCs 4A, 4B, and 4C, the control unit 12 updates and stores the setting complete flag for the PC from which electronic mail was transmitted in the user data storing unit 14. The setting complete flag stored indicates that the PC has been installed already (S6).

Next, the control unit 12 fetches the setting complete flag stored in the user data storing unit 14 and transmits it to the PC of a predetermined supervisor from the electronic mail sending/receiving unit 20. Accordingly, the supervisor is allowed to recognize the PC on which the printer drivers have already been installed hitherto on the screen (S7).

On the other hand, if the electronic mail reporting the completion of installation had been received from none of the PCs 4A, 4B, and 4C after the predetermined time t1 elapsed or if the electronic mail reporting the completion of installation had not been received from all of the PCs, electronic mail as delivered in Step S3 is delivered again only to the PC from which electronic mail reporting the completion of installation has not been received. Consequently, electronic mail continues to be resent to that one of the PCs 4 from which electronic mail reporting "installation completed" has not been received every time the predetermined time t1 elapses. The foregoing process is repeated till electronic mail reporting "installation completed" is received from all the PCs 4 (S9).

Thus, according to the present invention, if the supervisor or the like adds a new printer to the network or changes the model of the printer, e.g., the printer can automatically distribute the data for using the printer and the printer driver to each of the PCs by electric mail only if various settings related to electronic mail are made to the printer. Moreover, the supervisor can easily recognize, on the screen of his or her PC, which one of the PCs has been installed completely and which one of the PC has not been installed completely.

In installing the printer driver, therefore, the supervisor is no longer requested to visit the user to perform the installing operation, while the user is no longer requested to call the supervisor and attend the installing operation.

Although the foregoing embodiment has described the printers as an example of the image forming apparatus, the image forming apparatus is not limited to the printers. For example, the image forming apparatus may be a facsimile or a copier. Although the foregoing embodiment has described the PCs as an example of the external devices, it will easily be appreciated that the external devices may be servers or the like.

The time t1 which has been shown by way of example as a time interval between the sending and resending of electronic mail in the present embodiment may be a preset fixed time or may be set arbitrarily through the operation of the operational panel unit 18.

Since the image forming apparatus of the present invention is adapted to transmit, through electronic mail, the data for using the image forming apparatus and the driver for the apparatus to the external device corresponding to the electronic mail address, the laborious installing operation to be performed by the supervisor can be reduced.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus comprising:
    an interface for communication with other external devices which are connected thereto via a network;
    a first storing unit for storing address data for the external devices;
    a second storing unit for storing data for using the image forming apparatus; and
    a transmitting unit for transmitting, based on the address data stored in the first storing unit, the data for using the image forming apparatus stored in the second storing unit to the external devices via the interface.

2. The image forming apparatus according to claim 1, further comprising:
    a receiving unit for receiving return data from that one of the external devices to which the data for using the image forming apparatus has been transmitted, wherein
    the transmitting unit transmits again the data for using the image forming apparatus to that one of the external devices which has not transmitted the return data.

3. The image forming apparatus according to claim 2, wherein the transmitting unit transmits, to the specified one of the external devices, data representing that one of the external devices which has transmitted the return data to the image forming apparatus.

4. The image forming apparatus according to claim 1, wherein the address data is an electronic mail address.

5. The image forming apparatus according to claim 4,
    wherein the second storing unit stores a printer driver for the image forming apparatus and
    the transmitting unit transmits electronic mail to which the printer driver has been attached as attachment data.

6. The image forming apparatus according to claim 5, further comprising:
    a receiving unit for receiving return data from that one of the external devices to which the data for using the image forming apparatus has been transmitted, wherein
    the transmitting unit transmits again the data for using the image forming apparatus to that one of the external devices which has not transmitted the return data.

7. The image forming apparatus according to claim 6, wherein the transmitting unit transmits, to the specified one of the external devices, data representing that one of the external devices which has transmitted the return data to the image forming apparatus.

8. The image forming apparatus according to claim 5, further comprising:
    an operational unit for setting the address data for electronic mail.

* * * * *